United States Patent Office 3,491,782
Patented Jan. 27, 1970

3,491,782
PROCESS AND APPARATUS FOR PULSATING A LIQUID IN A COLUMN
Adriaan P. Oele, Geleen, Harry M. M. Otten, Echt, and Johan P. Nommensen, Stein, Netherlands, assignors to Stamicarbon N.V., Heerlen, Netherlands
Filed Aug. 17, 1967, Ser. No. 661,333
Claims priority, application Netherlands, Aug. 18, 1966, 6611676
Int. Cl. F17d 1/12; B67d 5/54; F04f 1/18
U.S. Cl. 137—13                                    13 Claims

ABSTRACT OF THE DISCLOSURE

There is provided an apparatus and process for superimposing a pulse flow or liquid flowing through a pulse column. Pressure is applied on an auxiliary column of liquid which communicates with the entry end of a pulse column, whereby liquid is forced from the auxiliary column of liquid into the pulse column. Sensing means determined when a preselected amount of liquid flows from the auxiliary column of liquid into the pulse column and thereafter releases the pressure applied to the auxiliary column of liquid. The liquid forced into the pulse column, therefore, flows back into the auxiliary column and a sensing means determined when a preselected amount of liquid has flowed back into the auxiliary column. This sequence of steps is repeated whereby predetermined pulses are applied to a pulse column. Suitably an arrangement of valves and a float in the auxiliary column are used to effect the pulse of liquid from the auxiliary column to the pulse column.

---

The present invention relates to a process and apparatus for pulsating a liquid in a column. In the process industry, so called pulsation columns are often used for treating liquids. Such columns are provided with means for pulsating the liquids in the columns, so that, in addition to their normal movement through the columns, the liquids make an intermittent up-and-down movement. It has been proposed to effect the pulsation in such columns by means of a diaphragm, which forms part of the wall of the column or of a space freely communicating with the columns. Compressed air is supplied to and discharged from a closed space located behind the diaphragm, the supply and discharge of air being controlled by the periodic movements of the diaphragm (compare the Netherlands patent application No. 295,891, which has been submitted for public inspection on May 10, 1965).

The applicability of a diaphragm depends, however, on the chemical resistance of the diaphragm to the liquids used in the pulsation column. Accordingly, the life of a diaphragm may be rather short, so that frequent interruption of the column operation may be required for diaphragm replacement.

It is, therefore, a major object of this invention to obviate these drawbacks and providing a process and apparatus which does not have to be interrupted frequently when used with liquid which will attack normal diaphragm materials, such as rubber and the like. Other objects will be apparent from the following disclosure and claims.

The present invention, therefore, provides a process for pulsing liquid in a pulsation column wherein an auxiliary column of liquid is connected to and is in communication with the entry end of the pulsation column, which will normally be the bottom end of the column as the columns are usually operated in an upright position. A pressure, suitably a fluid pressure such as air, or an inert gas as nitrogen, carbon dioxide, etc., is applied to the top of the auxiliary column of liquid to force some of the liquid out of the auxiliary column and into the pulsation column, whereby a pulse of liquid is superimposed on the liquid flowing through the pulsation column. A sensing device is provided with the auxiliary column to sense the amount of fluid forced out of the auxiliary column. Of course the amount of liquid to be forced out of the auxiliary column may be varied widely and is governed by the amplitude of the pulse desired. When the pre-determined amount of liquid is forced out of the auxiliary column, as determined by the sensing device, the applied pressure of the auxiliary column is released, which allows liquid to flow from the pulsation column back into the auxiliary column. The sensing device again senses when a desired amount of liquid has flowed back into the auxiliary column, normally the same amount forced out by the applied pressure. Thereafter the pressure is again applied to the auxiliary column and so on repeatedly. It will be apparent that the intermittent application and release of pressure on the auxiliary column accomplishes pulses, e.g. small up and down movements of liquid, superimposed on the liquid flowing through the pulsation column.

A device suitable for accomplishing this pulsating motion in the pulsation column comprises an auxiliary column partially filled with the same liquid as used in the pulsation column and communicating with the bottom end of the pulsation column. A sensing device is associated with the auxiliary column for sensing the liquid level therein. The sensing device is connected to and operates a means for applying a fluid pressure to the auxiliary column such as an inlet valve connected to the auxiliary column and to a source of compressed air. The fluid pressure forces liquid out of the auxiliary column into the pulsation column until the sensing device closes the inlet valve in response to a predetermined drop in the liquid level of the auxiliary column. The sensing device is also connected to a means for releasing the applied pressure such as an outlet or discharge valve which opens and releases the applied pressure in response to a predetermined drop in the liquid level of the auxiliary column. With the pressure of the auxiliary column released, liquid will flow from the pulsation column back into the auxiliary column. The sensing device follows the rise in height of the liquid level in the auxiliary column and when a predetermined rise is accomplished, usually the same height as was initially in the auxiliary column, the pressure release means is closed and the pressure applying means is again opened, hence repeating the action of the device.

While it will be readily apparent to one skilled in the art that the application and release of pressure on the auxiliary column can be accomplished by a number of devices and controlled by known sensing means, it has been found that a particular device is most suitable for accomplishing this process, is trouble free, and simple in construction.

According to the invention, an appartus is provided wherein a float which can be moved up and down is fitted in the auxiliary column. The auxiliary column is connected to and freely communicates with the entry end or bottom of the pulsation column and is shut off at the top, so that an air chamber is formed over the float, the latter fitting the auxiliary column with some clearance so that it is slidably moveable in the auxiliary column. The float is connected at the top to a valve rod which projects through a valve casing with two valves which are provided in the air chamber. On either side of the casing is carried a spring-loaded disc valve. A connection is provided for flowing a compressed fluid such as air or other gases to the chamber via one of the two valves accommodated in the valve casing and another connection is provided for discharging the air from the chamber via the other of the valves. A compact and sturdy device is thus obtained, the parts of which can be readily exchanged and only the float being in contact with the liquid in the auxiliary column.

Before the liquid is made to pulsate, it exerts sufficient pressure on the float to make it move upwards and open the compressed fluid supply valve via the valve rod. If compressed fluid is continuously supplied, the liquid in the column will be kept pulsating in a manner which will be further discussed below.

To prevent the liquid in the column from coming into contact with the compressed fluid (hereinafter exemplified as air) a slideable plate which tightly fits inside the auxiliary column and, consequently, prevents as much as possible the free flow of liquid from the column to the air chamber, may be provided at some distance from the float bottom. If so desired, the space over the said plate may be filled with an inert liquid, preferably, a low volatile liquid.

In addition, or instead, the air connections to the chamber may form part of a closed air system comprising two buffer vessels and a compressor, in which case the air-supply valve is connected to the outlet side of the compressor via one of the buffer vessels and the air-discharge valve is connected to the suction side of the compressor via the other buffer vessel.

The invention is illustrated by reference to the drawing wherein:

FIGURE 1 diagrammatically shows a vertical longitudinal section of a pulsation column provided with a device according to the invention.

Figure 1:
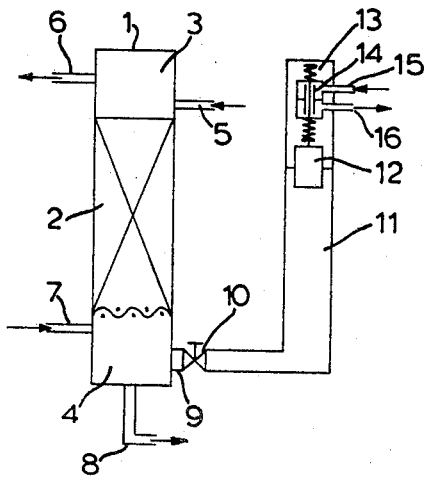

In FIGURE 1, there is shown a pulsation column 1 which, over part of its length, is filled with a packing 2. Over and under the part filled with the packing are collecting chambers 3 and 4, respectively, which are provided with liquid inlets and outlets 5 and 6 and 7 and 8, respectively.

Near the bottom of the column a connection 9 is provided, which, via a valve 10, communicates pulsation column 1 with the auxiliary column 11. A float 12 which is slidably moveable up and down is fitted in the said auxiliary column. This float is hollow and made of a material which is resistant to the liquids present in both columns. An example of this type of material is polyethylene. Other materials are chosen according to the nature of the liquid. The float has a diameter such that it fits in the auxiliary column with some clearance, e.g., 1 mm.

The auxiliary column 11 is closed at the top, so that an air chamber 13 is formed, which chamber accommodated a pair of valves which are controlled by the movements of the float 12. Connections 15 and 16 serve for the supply and the discharge of compressed air, respectively.

Figure 2:
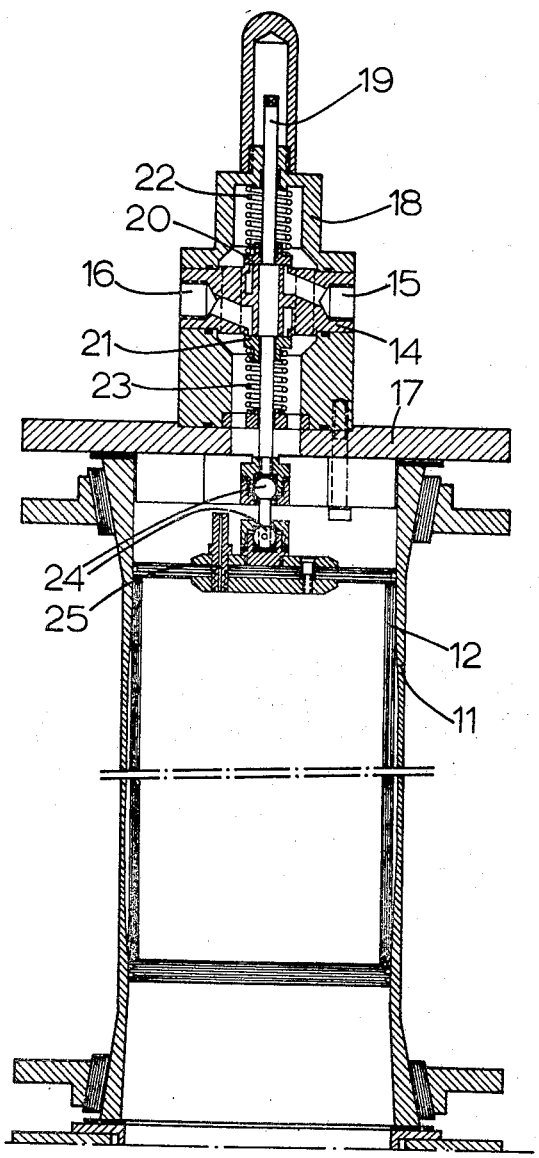
FIGURE 2 shows a detailed illustration of a vertical longitudinal section of the pressure applying and sensing device according to the invention.

FIGURE 2 gives a detailed view of the air chamber and the valves fitted therein. The auxiliary column 11 is closed at the top by a flange 17 and a cap 18, which together form the air chamber. The part of the auxiliary column in which the float 12 is fitted may advantageously be made of glass or a like transparent material in order that the movements of the float can be observed during operation. The float 12 carries a valve rod 19, which projects through the valve-seating block 14. The rod 19 is fastened to the float 12 by means of one or more ball and socket joints 24. The rod actuates disc valves 20 and 21 provided on either side of valve-seating block 14. Springs 22 and 23 serve to keep the valves 20 and 21, respectively, pressed against their seatings. The part of the valve rod 19 which is in the valve casing 14 is made thicker between the valves 20 and 21, while the distance between the stop surfaces is somewhat shorter than the distance between the valve seatings, so that the valves cannot be both opened at the same time. At the top, the float 12 is provided with a filling opening 25, through which liquid can be introduced into or discharged from the float for changing the total float mass if this should be required to increase the stability of the float body.

The operation of the pulsation device is as follows. The liquid in the auxiliary column exerts an upward pressure on the float 12, as a result of which the valve 20 for the supply of compressed air is opened by means of the valve rod 19. The compressed air supplied via this valve exerts a downward pressure on the liquid in the auxiliary column, in consequence of which this liquid will flow into the pulsation column 1 via the valve 10 and connection 9 and the liquid present in the pulsation column will be pushed upwards. Owing to the fact that these movements are attended with a downward movement of the float, the supply valve 20 is shut off by means of spring 22, after which the discharge valve 21 is opened via the valve rod 19. The decrease of the pressure exerted on the liquid in the auxiliary column allows the liquid to rise again, lifting the float. The discharge valve 21 closes, after which the supply valve 20 is opened. An oscillating movement being thus brought about, the float executing a completely vertical movement in the auxiliary column.

As compared with its diameter, the float body should be rather long to prevent jamming in the auxiliary column. The clearance of the float in the auxiliary column should not be so large that the length of stroke of the float is significantly affected.

With the system hereinbefore described, the discharged air comes from a space which also contains the same liquid as contained in the pulsation column. This arrangement may be objectionable if the vapor pressure of the liquid is high or if the liquid is toxic or otherwise harmful.

Figure 3:
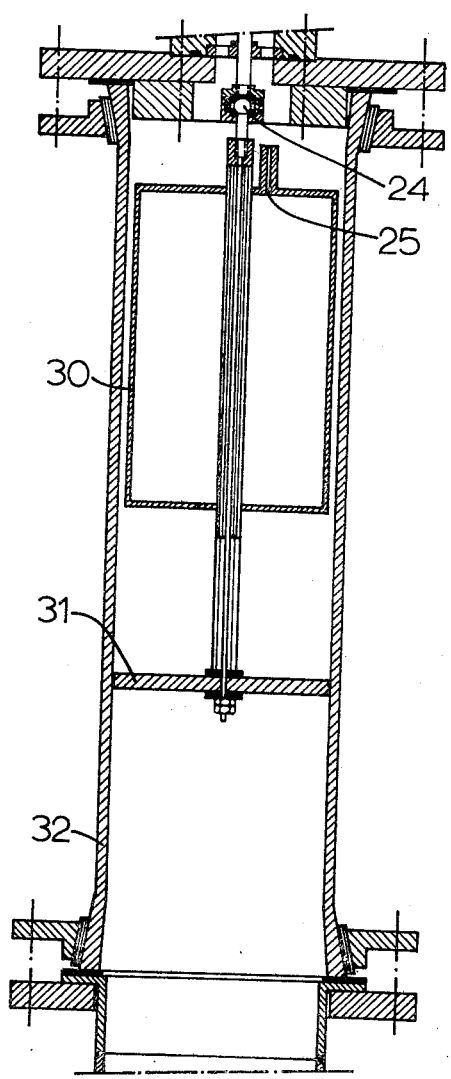
FIGURE 3 shows a modification to the pressure applying and sensing device according to the invention.

FIGURE 3 shows a modification which may be used in the above noted cases. Float 30 is made rather long, and a plate 31, which is a slideable tight fit in the auxiliary column 32, is suspended from its lower end. The space over the said plate and around the float 30 is now filled with an innocuous liquid having a low vapor pressure. If so required, more than one plate (not shown in the drawing) may be provided.

Figure 4:
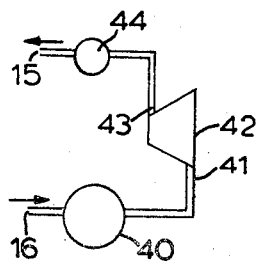
FIGURE 4 shows another modification to such a device.

Another possibility of preventing the disadvantage caused by contact with the liquid, is to use a closed compressed air circuit. A circuit of this type is shown schematically in FIGURE 4. The discharge pipe 16 of the pulsation device is connected to a buffer vessel 40, which in its turn connects to the suction side 41 of a compressor 42. The outlet side 43 communicates with a second buffer vessel 44, which feeds air into the air-supply connection 15 of the pulsation device. A completely closed circuit which does not in any way communicate with the atmosphere has thus been obtained. If desired, the circuit may be filled with an inert gas instead of with air. Naturally, the absorption of the gas into the liquid must be small in that case.

An additional advantage of using a closed circuit is that the efficiency of the pneumatic pulsator device can be increased by applying a higher pressure.

Having disclosed and illustrated the present invention it is obvious that various modifications thereof will be readily apparent to those skilled in the art. Therefore, the invention is not limited to the specific embodiments illustrated, but only by the spirit and scope of the appended claims.

What is claimed is:

1. A device for pulsating a liquid flowing through a pulsation column comprising:
    (1) an auxiliary column being partially filled with a liquid and communicating with the bottom of a pulsation column having an inlet and an outlet through which liquid continuously flows,
    (2) means for sensing liquid levels in the auxiliary column, (3) means operably connected to and actuated by the said sensing means for applying a fluid pressure to the liquid in the auxiliary column to force the liquid from the auxiliary column and into the pulsation column, in response to the liquid level in the auxiliary column rising to a predetermined height, (4) means operably connected to and actuated by the said sensing means for releasing the applied pressure on the liquid in the auxiliary column in response to the liquid level in the auxiliary column dropping to a predetermined height, whereby the liquid forced into the pulsation column returns to the auxiliary column and the liquid level in the auxiliary column rises.

2. The device of claim 1 having a float moveably disposed in the auxiliary columns, the auxiliary column having an enclosed chamber at the top thereof for receiving the said applied fluid pressure, a valve rod attached to said float and projecting through a valve-seating block having a fluid inlet and a fluid outlet valve and disposed within said chamber, said valves being spring loaded disc valves disposed on either side of said valve-seating block and connected to said valve rod, a connection for a source of compressed fluid to flow into the said chamber via the fluid inlet valve, and a connection from said chamber via the fluid outlet valve for discharging the compressed fluid.

3. Device according to claim 2, wherein, at some distance from its lower end, the float carries at least one plate which tightly fits the auxiliary column.

4. Device according to claim 3, wherein the space between the plate and the float is filled with a liquid other than the liquids present in the columns.

5. Device according to claim 2, wherein the said connections form part of a closed fluid system comprising two buffer vessels and a compressor, the fluid inlet valve being connected to the outlet side of the compressor via one of the buffer vessels and the fluid outlet valve being connected to the suction side of the compressor via the other buffer vessel.

6. Device according to claim 5, wherein the closed fluid system is filled with an inert gas.

7. Device according to claim 2, wherein the float is a hollow float, provided at the top thereof with a filling opening.

8. In a process for pulsating a liquid in a liquid treating pulsation column in which there is superimposed on the liquid passing through the pulsation column a further up and down pulsating movement of the liquid flowing therethrough, the improvement comprising the steps of:
(1) applying a pressure on an auxiliary column of the liquid which communicates with the entry end of the pulsation column, whereby liquid is forced from the auxiliary column of liquid into the pulsation column,
(2) sensing when a predetermined amount of liquid has flowed from the auxiliary column of liquid and into pulsation column,
(3) releasing the pressure applied on the auxiliary column of liquid when the predetermined amount of liquid has flowed from the auxiliary column of liquid into the pulsation column, whereby liquid forced from the auxiliary column of liquid into the pulsation column flows back into the auxiliary column of liquid from the pulsation column,
(4) sensing when a predetermined amount of liquid has flowed back into the auxiliary column of liquid from the pulsation column, and
(5) repeating steps 1 through 4 when the predetermined amount of liquid has flowed back into the auxiliary column of liquid from the pulsation column.

9. A device for pulsating a liquid in a column having an inlet and an outlet through which liquid continuously flows, which comprises a float chamber which is closed at its top to form an air chamber at the said top end, the said float chamber communicating with the bottom of the column, a float in the said float chamber, the top of said float being connected to a valve rod which projects through a valve-seating block in the said air chamber, the said valve rod carrying an inlet valve and an outlet valve on opposite sides of the said valve-seating block, said valves being spring-loaded disc valves, a first connection in the said valve-seating block for allowing compressed air to flow to the chamber via the said inlet valve and a second connection in the said valve-seating block allowing air to be discharged from the air chamber via the said outlet valve, the rise of liquid in the float chamber allowing the float to rise and to open the air-inlet valve via the valve rod.

10. A device according to claim 9, in which the float carries at some distance from its lower end at least one plate which tightly fits the float chamber.

11. A device according to claim 10, in which the space between the plate and the float is filled with a liquid other than the liquids present in the column.

12. A device according to claim 9, in which the said air connections in the valve-seating block form part of a closed air system comprising two buffer vessels and a compressor, the air-inlet valve being connected to the outlet side of the compressor via one of the buffer vessels and the air-outlet valve being connected to the suction side of the compressor via the other buffer vessel.

13. A device according to claim 12, in which the closed air system is filled with an inert gas.

References Cited

UNITED STATES PATENTS

| 2,541,630 | 2/1951 | Yeomans | 137—13 X |
| 2,898,927 | 8/1959 | Richards | 137—202 X |
| 3,285,138 | 11/1966 | Otten | 91—273 X |

ALAN COHAN, Primary Examiner

U.S. Cl. X.R.

137—209, 391